(12) United States Patent
Zhou

(10) Patent No.: US 12,542,921 B2
(45) Date of Patent: Feb. 3, 2026

(54) IN-LOOP MEMORY BANDWIDTH COMPRESSION IN VIDEO CODING

(71) Applicant: Avago Technologies International Sales Pte. Limited, Singapore (SG)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 149 days.

(21) Appl. No.: 18/499,060

(22) Filed: Oct. 31, 2023

(65) Prior Publication Data

US 2025/0142097 A1    May 1, 2025

(51) Int. Cl.
  *H04N 19/423*    (2014.01)
  *H04N 19/105*    (2014.01)
  *H04N 19/124*    (2014.01)
  *H04N 19/176*    (2014.01)

(52) U.S. Cl.
  CPC ......... *H04N 19/423* (2014.11); *H04N 19/105* (2014.11); *H04N 19/124* (2014.11); *H04N 19/176* (2014.11)

(58) Field of Classification Search
  CPC .. H04N 19/105; H04N 19/423; H04N 19/124; H04N 19/176
  See application file for complete search history.

(56) References Cited

U.S. PATENT DOCUMENTS

| | | | |
|---|---|---|---|
| 6,208,273 B1* | 3/2001 | Dye | H04N 19/70 |
| | | | 341/51 |
| 2002/0097172 A1* | 7/2002 | Fallon | H03M 7/4006 |
| | | | 341/51 |
| 2009/0257485 A1* | 10/2009 | Youn | H04N 19/182 |
| | | | 375/240.01 |
| 2011/0216834 A1 | 9/2011 | Zhou | |
| 2017/0150159 A1* | 5/2017 | Lee | H04N 19/52 |
| 2019/0215519 A1* | 7/2019 | Huang | H04N 19/152 |
| 2021/0092376 A1* | 3/2021 | Nalci | H04N 19/61 |
| 2022/0286142 A1 | 9/2022 | Fenney | |

OTHER PUBLICATIONS

Extended European Search Report, European Application No. 24199807.9 dated Mar. 12, 2025, 9 pages.

* cited by examiner

*Primary Examiner* — Zhubing Ren
(74) *Attorney, Agent, or Firm* — King Intellectual Asset Management

(57) ABSTRACT

A video decoder with in-loop memory bandwidth compression is provided. A video decoder includes a decoding logic configured to decode an encoded bitstream to generate a reference block of video data, and a memory bandwidth compression logic configured to compress the reference block of video data based on a selection between a first compression algorithm, second compression algorithm, or to copy the reference block without compression. Selection is based on at least one of the first block size, second block size, or uncompressed block size. The selected block is written to an off-chip memory, and a compression algorithm indicator associated with the selected block is written to an on-chip memory.

20 Claims, 8 Drawing Sheets

IN-LOOP MEMORY BANDWIDTH COMPRESSION IN VIDEO CODING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for memory management during video coding.

BACKGROUND

For UHD video applications in which large amounts of data are transferred between on-chip and the off-chip memory buffers, memory bandwidth becomes a bottleneck for video encoding and decoding. In conventional video decoding, due to limited on-chip memory size, the reconstructed blocks after in-loop filtering are written into an off-chip memory buffer, also called a Decoded Picture Buffer (DPB) to store the decoded pictures. Reference picture data is fetched from the DPB by a decoder by inter prediction logic for motion compensation, and by display processing for display.

Accordingly, in conventional approaches to video coding, memory bandwidth is consumed in writing reconstructed picture data from an on-chip memory buffer to the off-chip memory buffer, and in fetching decoded picture data from the off-chip memory buffer to an on-chip buffer for motion compensation/inter prediction and display processing.

Thus, an in-loop memory bandwidth compression architecture for reducing memory bandwidth consumption is provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
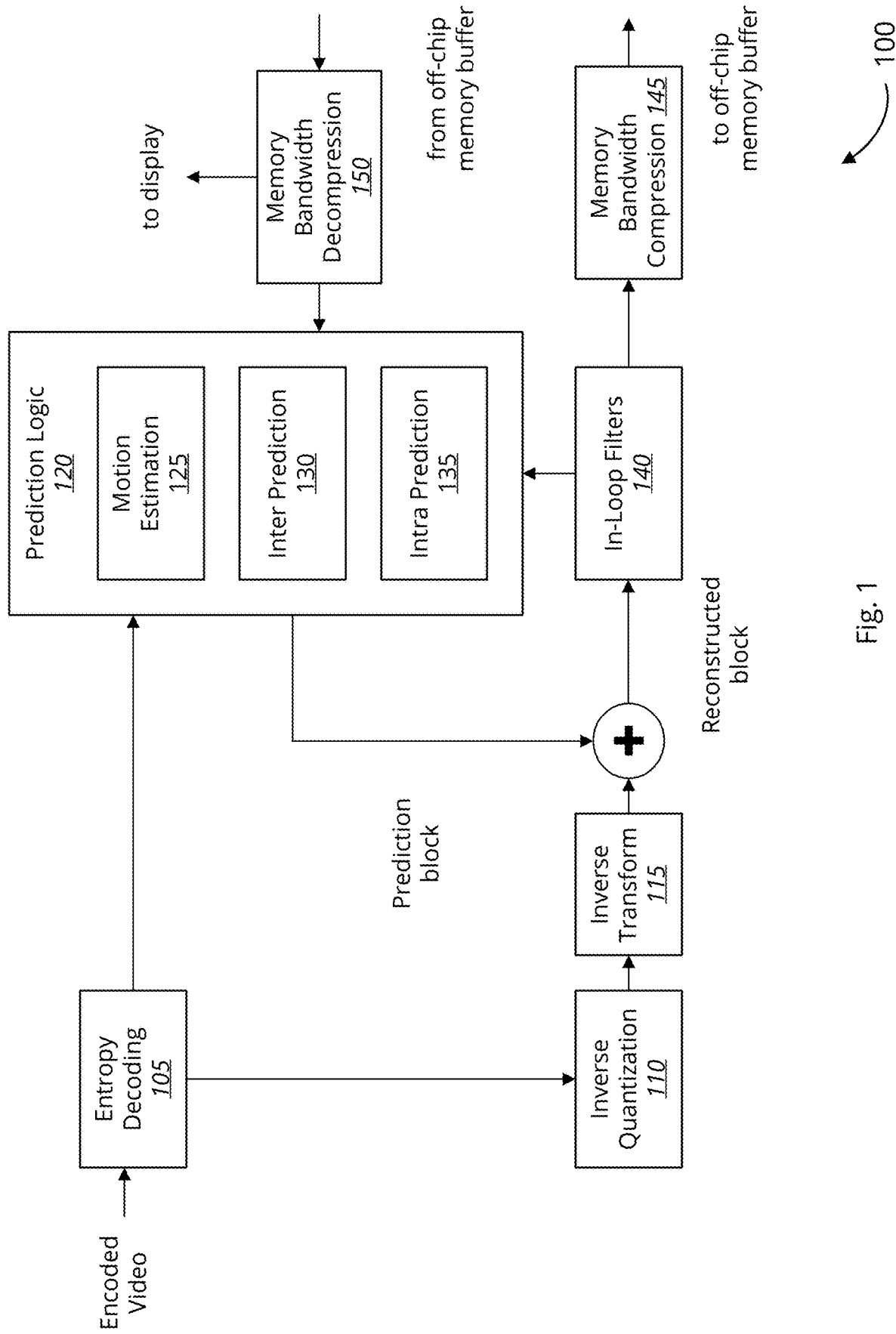
FIG. 1 is a schematic block diagram of a decoder with in-loop memory bandwidth compression, in accordance with various embodiments.

Various embodiments set forth an architecture for in-loop memory bandwidth compression in a video decoder.

In some embodiments, an apparatus for in-loop memory bandwidth compression is provided. The apparatus includes a processor, and a non-transitory computer-readable medium in communication with the processor. The non-transitory computer-readable medium having encoded thereon a set of instructions executable by the processor to generate a reference block of video data, wherein the reference block is generated, at least in part, based on an encoded bitstream, and select one of a first compressed block, second compressed block, or uncompressed block based, at least in part, on at least one of a first block size of the first compressed block, a second block size of the second compressed block, or a uncompressed block size of the uncompressed block. The first compressed block may be the reference block after a first compression algorithm is applied, the second compressed block may be the reference block after a second compression algorithm applied, and the uncompressed block may be a copy of the reference block, wherein the uncompressed block size is equal to the size of the reference block. The instructions may further be executed by the processor to write a selected block of the first compressed block, second compressed block, or uncompressed block to an off-chip memory, and write a compression algorithm indicator associated with the selected block of the first compressed block, second compressed block, or uncompressed block to an on-chip memory. The compression algorithm indicator may be configured to indicate whether the selected block is compressed or uncompressed.

In further embodiments, a video decoder is provided. The includes a decoding logic configured to decode an encoded bitstream, wherein decoding the encoded bitstream includes generating a reference block of video data, and a memory bandwidth compression logic configured to compress the reference block of video data. The memory bandwidth compression logic may include a first compression logic configured to generate a first compressed block by applying a first compression algorithm on the reference block, wherein the first compressed block is the reference block after the first compression algorithm is applied, and wherein the first compressed block has a first block size, a second compression logic configured to generate a second compressed block by applying a second compression algorithm on the reference block, wherein the second compressed block is the reference block after the second compression algorithm is applied wherein the second compressed block has a second block size, and copy logic configured to generate an uncompressed block, wherein the uncompressed block is a copy of the reference block, wherein the uncompressed block has an uncompressed block size equal to the size of the reference block. The memory bandwidth compression logic further includes selection logic configured to select one of the first compressed block, second compressed block, and uncompressed block based, at least in part, on at least one of the first block size, second block size, or uncompressed block size. The memory bandwidth compression logic may further be configured to write the selected block of the first compressed block, second compressed block, or uncompressed block to an off-chip memory, and to write a compression algorithm indicator associated with the selected block of the first compressed block, second compressed block, or uncompressed block to an on-chip memory. The compression algorithm indicator may be configured to indicate whether the selected block is compressed or uncompressed.

In further embodiments, a system for in-loop memory bandwidth compression is provided. The system includes an off-chip memory buffer, an on-chip memory buffer, and a video decoder coupled to the off-chip memory buffer and the on-chip memory buffer, the video decoder configured to decode an encoded bitstream to generate a reference block. The video decoder may include memory bandwidth compression logic configured to compress the reference block of video data. The memory bandwidth compression logic includes a first compression logic configured to generate a first compressed block by applying a first compression algorithm on the reference block, wherein the first compressed block is the reference block after the first compression algorithm is applied, and wherein the first compressed block has a first block size, a second compression logic configured to generate a second compressed block by applying a second compression algorithm on the reference block, wherein the second compressed block is the reference block after the second compression algorithm is applied wherein the second compressed block has a second block size, and copy logic configured to generate an uncompressed block, wherein the uncompressed block is a copy of the reference block, wherein the uncompressed block has an uncompressed block size equal to the size of the reference block. The memory bandwidth compression logic may further include selection logic configured to select one of the first compressed block, second compressed block, and uncompressed block based, at least in part, on at least one of the first block size, second block size, or uncompressed block size. The memory bandwidth compression logic may be configured to write the selected block of the first compressed block, second compressed block, or uncompressed block to the off-chip memory buffer, and to write a compression algorithm indicator associated with the selected block of the first compressed block, second compressed block, or uncompressed block to the on-chip memory buffer. The compression algorithm indicator may be configured to indicate whether the selected block is compressed or uncompressed.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element (which includes mechanically, electrically, or communicatively connecting or coupling), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

With increasingly higher resolution video applications (such as 8K @ 120 fps, etc.), writing data to an off-chip memory buffer and reading data from the off-chip memory buffer consumes limited memory bandwidth within a video coding system. In conventional approaches to video coding, memory bandwidth is consumed at various stages of the decoding process, for example, by fetching data from the off-chip memory buffer for motion compensation/inter prediction, and display processing. Moreover, reconstructed blocks are written to the off-chip memory buffer for later retrieval.

Thus, a video coding architecture for in-loop memory bandwidth compression is provided. Utilizing in-loop memory bandwidth compression, reconstructed blocks may be selectively compressed, according to a compression scheme, before being written to the off-chip memory buffer, and a compression algorithm indicator picture stored in on-chip memory. When the compressed block is fetched from the off-chip memory buffer, the compressed block may be decompressed according to the compression algorithm indicator picture.

A block, as used herein, refers to a block of video data. Specifically, a picture (e.g., an image/frame of the video data) may be divided into coding tree units (CTUs). Each CTU may further be divided into one or more coding units (CUs), which may represent square (or rectangular) subdivisions of the CTU. A block may represent a square or rectangular region of pixels within a CU and/or CTU. Thus, hierarchically, a CTU may include multiple CUs, and a CU includes multiple blocks. A CU may be as large as its root CTU, and/or a subdivision of the CTU. For example, the CTU may be divided into subdivisions of up to 4×4 blocks (e.g., up to 16 total blocks). Thus, a CU may be the size of a single subdivision of the CTU.

The "block size," or size of a block, may refer to the size of a block of video data as stored in memory (e.g., how much space the block takes in memory, such as an allocated number of number of bits/bytes in memory). A "compressed block," may therefore refer to a block of video data (including a reconstructed block of video data) that has been compressed by a compression algorithm, as will be described in greater detail below. A compressed block size may refer to the size of the block (in memory) after the compression algorithm has been applied. An uncompressed block may refer to a block of video data that has not undergone compression (e.g., has not had a compression algorithm applied). Similarly, an uncompressed block size may refer to the size of an uncompressed block in memory.

FIG. 1 is a schematic block diagram of a decoder 100 with in-loop memory bandwidth compression, in accordance with various embodiments. The decoder 100 includes entropy decoding logic 105, inverse quantization logic 110, inverse transform logic 115, prediction logic 120 (including motion estimation logic 125, inter prediction logic 130, and intra prediction logic 135), in-loop filters 140, memory bandwidth compression logic 145, and memory bandwidth decompression logic 150. It should be noted that the various elements of the decoder 100 are schematically illustrated in FIG. 1, and that modifications to the various components and other arrangements of the decoder 100 may be possible and in accordance with the various embodiments.

In various embodiments, the decoder 100 may be part of a media coding system that includes a media decoder and media encoder. The decoder 100, in various embodiments, is a video decoder. In various examples, the decoder 100 may be implemented in various types of hardware, such as one or more microprocessors, a digital signal processor (DSP), a custom integrated circuit (IC), programmable logic, such as a field-programmable gate array (FPGA), and/or discrete logic. The decoder 100 may, at least in part, be implemented in software, hardware, or a combination of software and hardware. As used herein, logic may refer to logic implemented in hardware (e.g., a logic circuit, programmable logic, etc.), software, and/or hardware and software.

In various embodiments, the encoded video data may include a bitstream of encoded video blocks received by the decoder (e.g., from an encoder, storage device, streaming media, etc.). Accordingly, in various examples, the entropy decoding logic 105 is configured to decode the encoded bit stream of video data. Specifically, entropy decoding logic 105 may be configured to decode the encoded bitstream and extract quantized elements from the encoded bitstream for further processing.

For example, the entropy decoding logic 105 may decode the incoming bitstream and deliver decoded elements (e.g., quantized elements), which may include, without limitation, quantized transform coefficients and control information, such as delta intra prediction modes, inter prediction modes, motion vector differences, merge indices (merge_idx), quantization parameters, and in-loop filter parameters.

In some examples, the quantized elements extracted from the bitstream may undergo inverse quantization (also referred to interchangeably as "dequantization") by inverse quantization logic 110. In some examples, dequantization of a quantized element produces a respective coefficient (e.g., transform coefficient), which is then further inverse transformed via the inverse transform logic 115. In some examples, a transform may have been skipped for certain blocks. Accordingly, in some embodiments, the inverse transform may not be applied to those blocks. Once inverse transform has been applied (or skipped as set forth above), a residual block may be produced.

In various examples, the residual block, may be added to a corresponding prediction block from the prediction logic 120. Combining the residual block with the prediction block generates a resulting "reconstructed block." The reconstructed block may be passed through one or more in-loop filters 140, and provided to the prediction logic 120 to produce a subsequent prediction block. The reconstructed blocks, after having in-loop filters 140 applied, may also be provided to memory bandwidth compression logic 145 for compression.

Thus, the dequantized elements produced by the dequantization logic 110 may be used to generate the reconstructed block, and the reconstructed block may be filtered, via the in-loop filters 140, and compressed for storage (e.g., in an off-chip memory buffer) via the memory bandwidth compression logic 145. In various examples, the prediction block may be generated by prediction logic 120 based on a coding mode, intra prediction parameters of the block, as determined by intra prediction logic 135, and motion data as determined via motion estimation logic 125. As previously described, the selecting a coding mode may include specifying an intra coding mode or inter prediction mode.

In some examples, the intra prediction mode for a given block may be reconstructed by deriving a most probably mode (MPM) list using the decoded delta intra prediction mode, while the motion data (e.g., motion vectors, reference indices) is reconstructed by deriving an Advanced Motion Vector Predictor (AMVP) list or a merge/skip list and using MVDs. The decoded motion data of the current picture may serve as the temporal motion vector predictors (TMVPs) for decoding of future frames (e.g., images or pictures decoded from a respective block). Based on signaled intra or inter prediction modes, the prediction logic 120 may perform intra prediction via intra prediction logic 130, or inter prediction (e.g., motion compensation) via the inter prediction logic 130, to produce the prediction blocks.

In various examples, in-loop filtering may be applied via in-loop filters 140. In-loop filters 140 may include one or more filters, such as, without limitation, a de-blocking filter, SAO (Sample Adaptive Offset) filter and adaptive loop filter (ALF). In-loop filtering may be performed on the reconstructed blocks, as previously described, to generate "reconstructed blocks after in-loop filters," also referred to interchangeably as "filtered reconstructed blocks." The reconstructed blocks after in-loop filters (e.g., part of a frame or image) may then be passed to memory bandwidth compression logic 145 for compression and storage in a storage device. The compressed video data from the storage device may later be retrieved and decompressed, via memory bandwidth decompression logic 150, for display processing to be displayed.

For off-chip memory access, data is written or fetched in units of a double data rate (DDR) burst (e.g., 32 bytes, 64 bytes, etc.) of the off-chip memory. Thus, any data access larger than m−1 and less than or equal to m-number of DDR burst size will count as an m-number of DDR bursts. In various examples, the uncompressed block size may be a multiple of a DDR burst (e.g., m-times a DDR burst size-1 times the size of a DDR burst, 2 time the size of a DDR burst, etc.). Accordingly, with threshold block size T being set to half of an uncompressed block size, the memory bandwidth saving can be given as half of the percentage of blocks that are compressed to a size less than or equal to the threshold block size, T.

Details of the memory bandwidth compression logic 145 are provided below with respect to FIG. 2, and details of the memory bandwidth decompression logic 150 are set forth with respect to FIG. 3.

Figure 2:
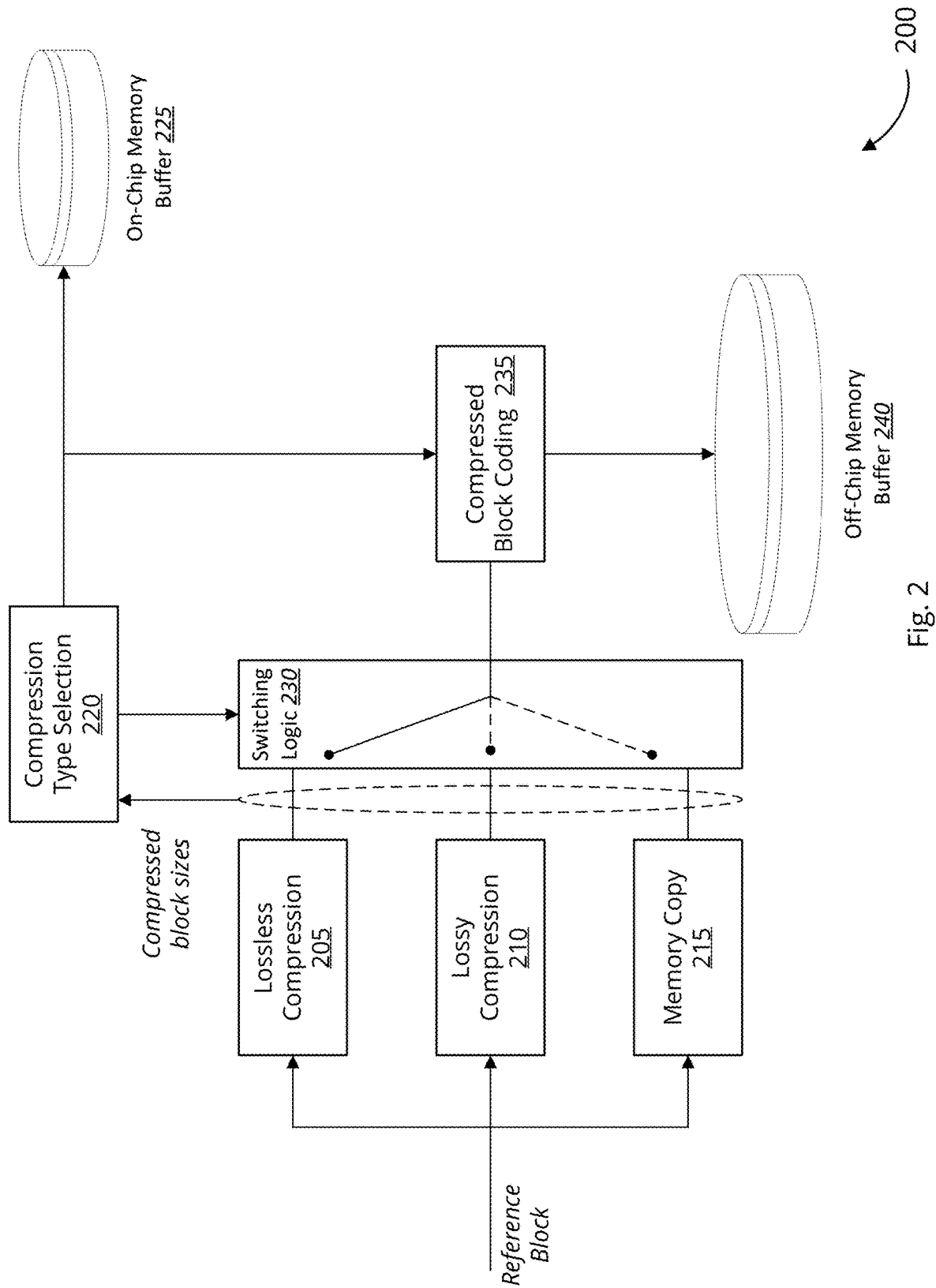
FIG. 2 is a schematic block diagram of an in-loop memory bandwidth compression logic, in accordance with various embodiments.

FIG. 2 is a schematic block diagram of an in-loop memory bandwidth compression logic 200, in accordance with various embodiments. The in-loop memory bandwidth compression logic 200 includes lossless compression logic 205, lossy compression logic 210, memory copy logic 215, compression type selection logic 220 coupled to an on-chip memory buffer 225, switching logic 230, and compressed block coding logic 235 coupled to an off-chip memory buffer 240. It should be noted that the various elements of the in-loop memory bandwidth compression logic 200 are schematically illustrated in FIG. 2, and that modifications to the various components and other arrangements of the in-loop memory bandwidth compression logic 200 may be possible and in accordance with the various embodiments.

In various examples, the in-loop memory bandwidth compression logic 200 may receive a reference block to be compressed according to one or more compression algorithms. In various examples, the term "reference block" refers to a block of video data being processed (e.g., to which the compression algorithm is applied). For example, the reference block may be a reconstructed block after in-loop filters (e.g., part of a frame or image data) as previously described.

In some embodiments, the in-loop memory bandwidth compression logic 200 may include lossless compression logic 205, lossy compression logic 210, and memory copy logic 215. Lossless compression logic 205 may include logic to apply one or more lossless compression algorithms to the reference block. A lossless compression algorithm may include any compression algorithm after which the compressed data may be reconstructed without loss of information. Accordingly, any suitable lossless compression algorithm may be applied. For example, Golomb coding (such as exponential Golomb coding) may be utilized, as will be described in greater detail below with respect to FIG. 5.

Similarly, lossy compression logic 210 includes logic to apply one or more lossy compression algorithms to the reference block. Lossy compression is a compression algorithm in which information is lost during reconstruction (for example, discrete cosine transform (DCT), etc.). It should be noted that both lossless and lossy compression algorithms both include any suitable memory bandwidth compression algorithms. Memory copy logic 215 may include logic to make a copy of the reference block, without applying compression techniques.

As previously described with respect to FIG. 1, the in-loop memory bandwidth compression logic 200 is placed after the in-loop filters to compress the filtered reconstructed blocks before it is written into off-chip memory, such as off-chip memory buffer 240.

The in-loop memory bandwidth compression logic 200 may be configured to select a memory bandwidth compression technique to be applied to the reference block. In various embodiments, the reference block (e.g., reconstructed block) may be compressed using lossless compression (by lossless compression logic 205) producing a lossless compressed block, and lossy compression (by lossy compression logic 210) producing a lossy compressed block. The compressed blocks (both lossless and lossy), as well as a copy of the reference block, may be buffered (e.g., stored in a buffer). The sizes of the lossless compressed block ($S_{lossless}$), size of the lossy compressed block ($S_{lossy}$), and size of the copy of the reference block ($S_{copy}$) may further be determined and output to the compression type selection logic 220.

In various embodiments, a compression algorithm (e.g., lossless, lossy, or memory copy) may be selected by the compression type selection logic 220, based on the respective sizes of the compressed blocks, $S_{lossless}$, $S_{lossy}$, and copy of the reference block, $S_{copy}$. In some examples, selection of the compression algorithm may be determined according to the following decision logic:

$$\text{compression\_type} = \begin{cases} \text{lossless} & \text{if } S_{lossless} \le T \\ \text{lossy} & \text{if } S_{lossless} > T \text{ and } S_{lossy} \le T \\ \text{memory copy} & \text{if } S_{lossless} > T \text{ and } S_{lossy} > T \end{cases} \quad (\text{eq. 1})$$

Where T is a pre-defined threshold (e.g., threshold block size). In one example, T may be set to the half of original block size, or $S_{copy}/2$.

In some further embodiments, a flag may be signalled to indicate that in-loop memory bandwidth compression is not applied to a picture. This can be applicable to the cases in which none of blocks in the picture can be compressed to a size less than or equal to the pre-defined threshold, T, or the memory bandwidth compression is disabled for the given picture. For example, in-loop memory bandwidth compression may be applied only for picture resolutions of 4K and above.

The selected compression algorithm may be coded using a 2-bit indicator. The "indicator" is referred to interchangeably as the "compression algorithm indicator." The 2-bit indicator thus indicates the selected compression algorithm, and the 2-bit indicator may itself be written into an on-chip memory buffer 225. For example, in some embodiments, the first bit of the 2-bit indicator may indicate whether the block is compressed or uncompressed (e.g. "1" for compressed and "0" for uncompressed). If compressed, the second bit may indicate whether the block is compressed with a lossless or lossy compression algorithm (e.g. "1" for lossless compression, and "0" for lossy compression). In some examples, if the block is uncompressed (e.g., a memory copy), the second bit may be ignored.

Compression type selection logic 220 may further cause switching logic 230 to select between the lossless compressed block, lossy compressed block, or memory copy block (e.g., choose between the outputs of the lossless compression logic 205, lossy compression logic 210, or memory copy logic 215). In some examples, the switching logic 220 may include a switch that is controlled by the compression type selection logic 220 (e.g., the 2-bit compression algorithm indicator as previously described). In other embodiments, the switching logic 230 may be implemented as a multiplexer controlled, for example, by the 2-bit compression algorithm indicator.

The selected compressed or uncompressed block may be written into the off-chip memory buffer 240. In some examples, to ensure random access, each block, regardless of whether it is compressed or uncompressed, may be allocated with the same storage space (e.g., the size of the original block) in the off-chip memory buffer.

Thus, an on-chip memory buffer, as used herein, may refer to a buffer allocated in on-chip memory. On-chip memory includes, for example, memory implemented on-chip (e.g., a processor chip). On-chip memory (also called on-chip random access memory (OCRAM)) may, for example, include static random access memory (SRAM). Conversely, an off-chip memory buffer, as used herein, may refer to a buffer allocated in off-chip memory. Off-chip memory, for example, may include dynamic random access memory (DRAM).

Figure 3:
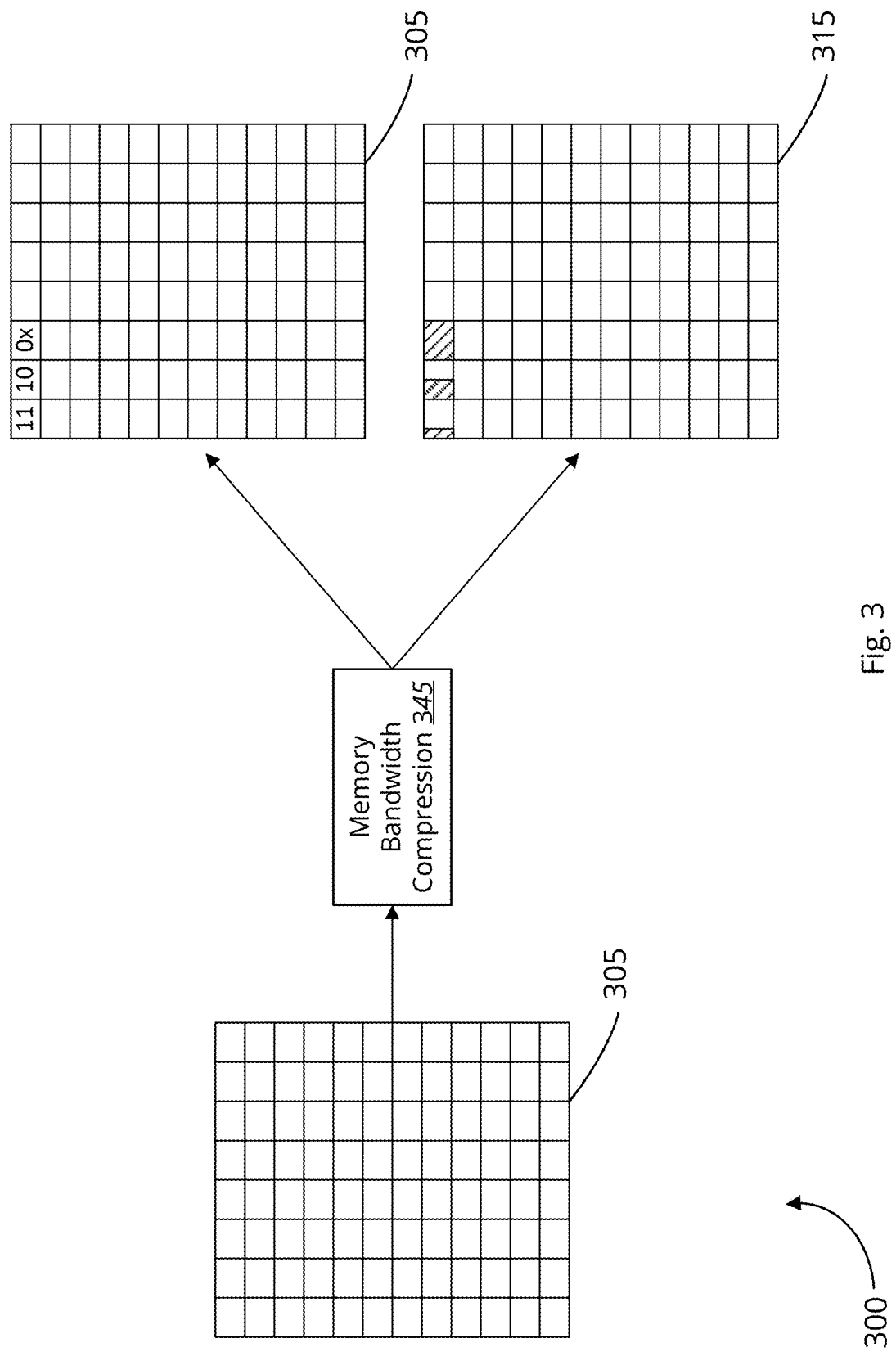
FIG. 3 is a schematic diagram of a memory storage layout for a reconstructed picture after memory bandwidth compression, in accordance with various embodiments.

FIG. 3 is a schematic diagram of a memory storage layout 300 for a reconstructed picture after memory bandwidth compression, in accordance with various embodiments. In the embodiments depicted, the reconstructed picture 305 is divided into non-overlapped blocks of equal block size (except at the right and bottom picture boundaries the block size could be smaller because the picture size may not be a multiple of the selected block size).

In various embodiments, an on-chip memory buffer, such as on-chip memory buffer 225, may be configured to store respective compression algorithm indicators, as previously described, for each block of the reconstructed picture. Thus, a "compression algorithm indicator picture" may be stored in the on-chip memory buffer, corresponding to the reconstructed picture 305.

Similarly, in various embodiments, an off-chip memory buffer, such as off-chip memory buffer 240, may be allocated to store a compressed and/or uncompressed blocks output by the memory bandwidth compression logic 345. In this way, the combined compressed and/or uncompressed blocks may be combined to form a "compressed reference picture," which may be stored by the off-chip memory buffer.

In various examples, each block may be configured to occupy the same amount of memory space in the respective on-chip and off-chip memory buffers. For example, the 2-bits in the on-chip memory buffer for the compression algorithm indicator may occupy the same amount of memory space as a compressed block in the off-chip memory buffer, which may occupy the same space as an uncompressed block in the off-chip memory buffer.

In the depicted example, the first block may be compressed using a lossless compression algorithm. Thus, a compression algorithm indicator of "11" may be written into the on-chip memory buffer, and the lossless compressed block may be written to the off-chip data buffer (the compressed block data is depicted by the hatched region). The second block of the reconstructed block may be lossy compressed. Thus, "10" may be written into the on-chip memory buffer, and the lossy compressed block written to the off-chip data buffer (the compressed block data similarly shown as the hatched region). The third block may be uncompressed. Thus, either one of "01" or "00" may be written into the on-chip memory buffer, and the uncompressed block (e.g., the reconstructed block after in-loop filtering) may be written to the off-chip data buffer, with the entirety of the block shown in hatched. In some examples, because each block is allocated the same amount of memory space, between the first block and the second block, and the second block to the third block, there may be empty space (e.g., storage holes) in the respective buffers.

Figure 4:
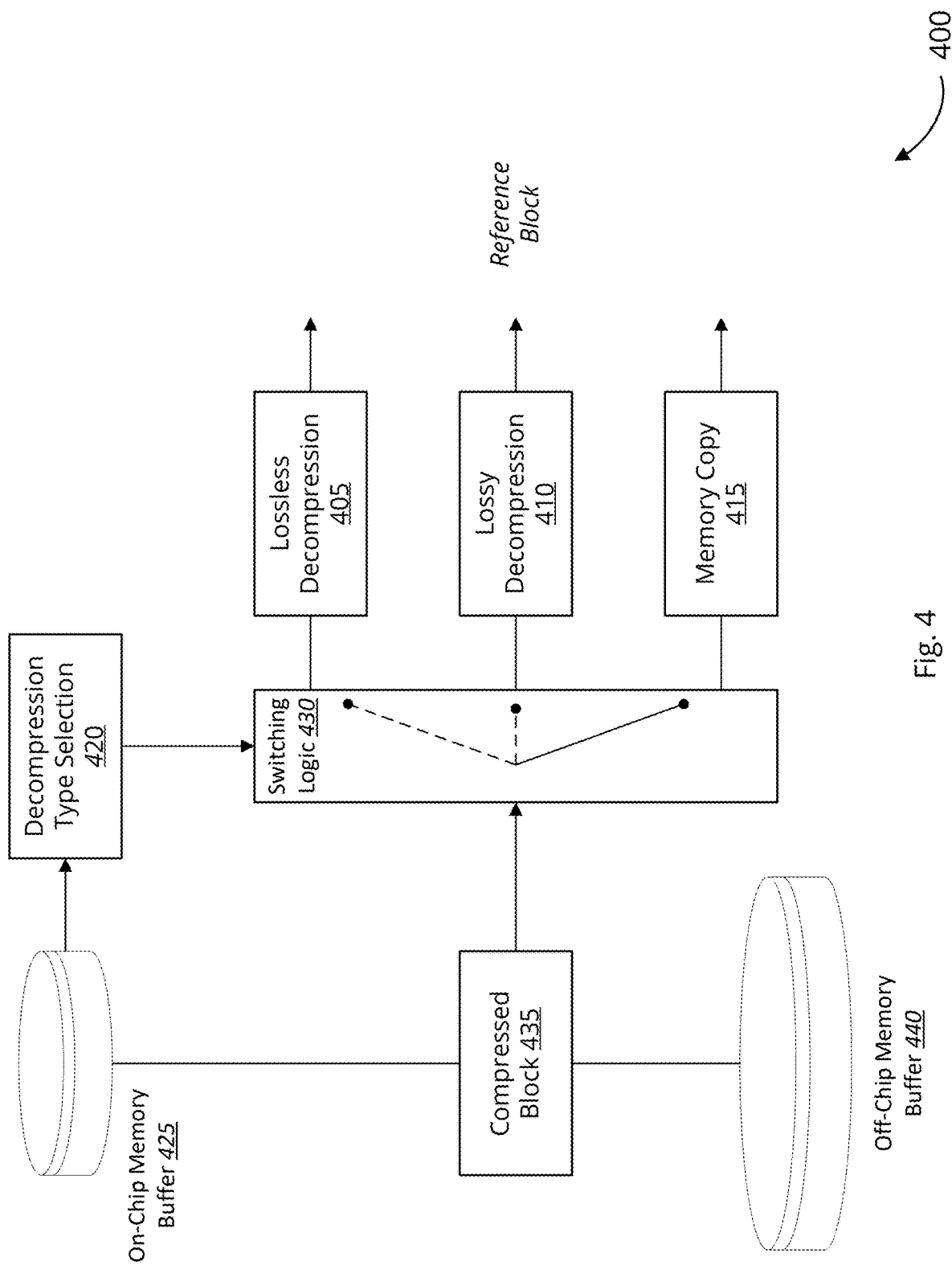
FIG. 4 is a schematic block diagram of an in-loop memory bandwidth decompression logic, in accordance with various embodiments.

FIG. 4 is a schematic block diagram of an in-loop memory bandwidth decompression logic 400, in accordance with various embodiments. The in-loop memory bandwidth decompression logic 400 includes lossless decompression logic 405, lossy decompression logic 410, memory copy logic 415, decompression type selection logic 420 coupled to an on-chip memory buffer 425, switching logic 430, and compressed block 435 coupled to an off-chip memory buffer 440 and the on-chip memory buffer 425. It should be noted that the various elements of the in-loop memory bandwidth decompression logic 400 are schematically illustrated in FIG. 4, and that modifications to the various components and other arrangements of the in-loop memory bandwidth decompression logic 400 may be possible and in accordance with the various embodiments.

The memory bandwidth decompression logic 400 may be placed before the prediction logic, such as prediction logic 120, and display processing logic, to decompress the fetched compressed block 435 data from the off-chip memory buffer 440. The decompressed block data may be used for motion compensation by the prediction logic and display processing.

Based on the current block location in the picture/frame, the compression algorithm indicator may be read for the respective compressed block 435 from the on-chip memory buffer 425. Based on the compression indicator, the decompression type selection logic 420 may be configured to control switching logic 430 to select the appropriate decompression logic: lossless decompression logic 405, lossy decompression logic 410, or memory copy logic 415.

For example, if the fetched compressed block 435 data is uncompressed, the block data of the uncompressed block size is fetched from the off-chip memory buffer 440 based on the current block location in the picture. Otherwise, the block data of a reduced block size T (typically half of the uncompressed block size if T is set to half of the uncompressed block size $S_{copy}$) is fetched from the off-chip memory buffer 440 based on the current block location in the picture.

If the fetched block is compressed, then depending on the compression indicator, either lossless or the lossy decompression logic 405, 410 may be selected, and a respective lossless or lossy decompression algorithm may be applied to reconstruct the compressed block 435. If the fetched compressed block 435 is not compressed, then the fetched compressed block 435 may be copied via memory copy logic 415. The reconstructed block (either decompressed or copied) may be stored in an on-chip cache memory buffer for further processing. It is to be understood that for lossless and lossy compression/decompression, various suitable algorithms may be utilized, and embodiments are not limited to any specific compression/decompression algorithms.

It should further be noted that the "reconstructed block" in the context of the decompression of a fetched compressed block 435 should be contrasted with the "reconstructed block" produced by a decoder from an encoded bitstream (as described above with respect to FIGS. 1-3). In both instances, the block is "reconstructed," and may in some instances refer to the same block. However, with respect to FIGS. 1-3, the reconstructed block is reconstructed from an encoded bitstream. As such, the reconstructed block itself may be compressed to form the compressed block 435. The compressed block is then "reconstructed" (e.g., decompressed) utilizing a decompression algorithm as described above. This reconstructed block may differ from the originally compressed reconstructed block (described in FIG. 2) in that some information may be lost from the original reconstructed block (for example in the event that a lossy compression algorithm was applied). To differentiate, in some examples, the "reconstructed block" before the compression algorithm is applied may be referred to as the "reference block" in FIG. 2.

Examples of compression/decompression algorithms are described in greater detail below with respect to FIGS. 5-7.

Figure 5:
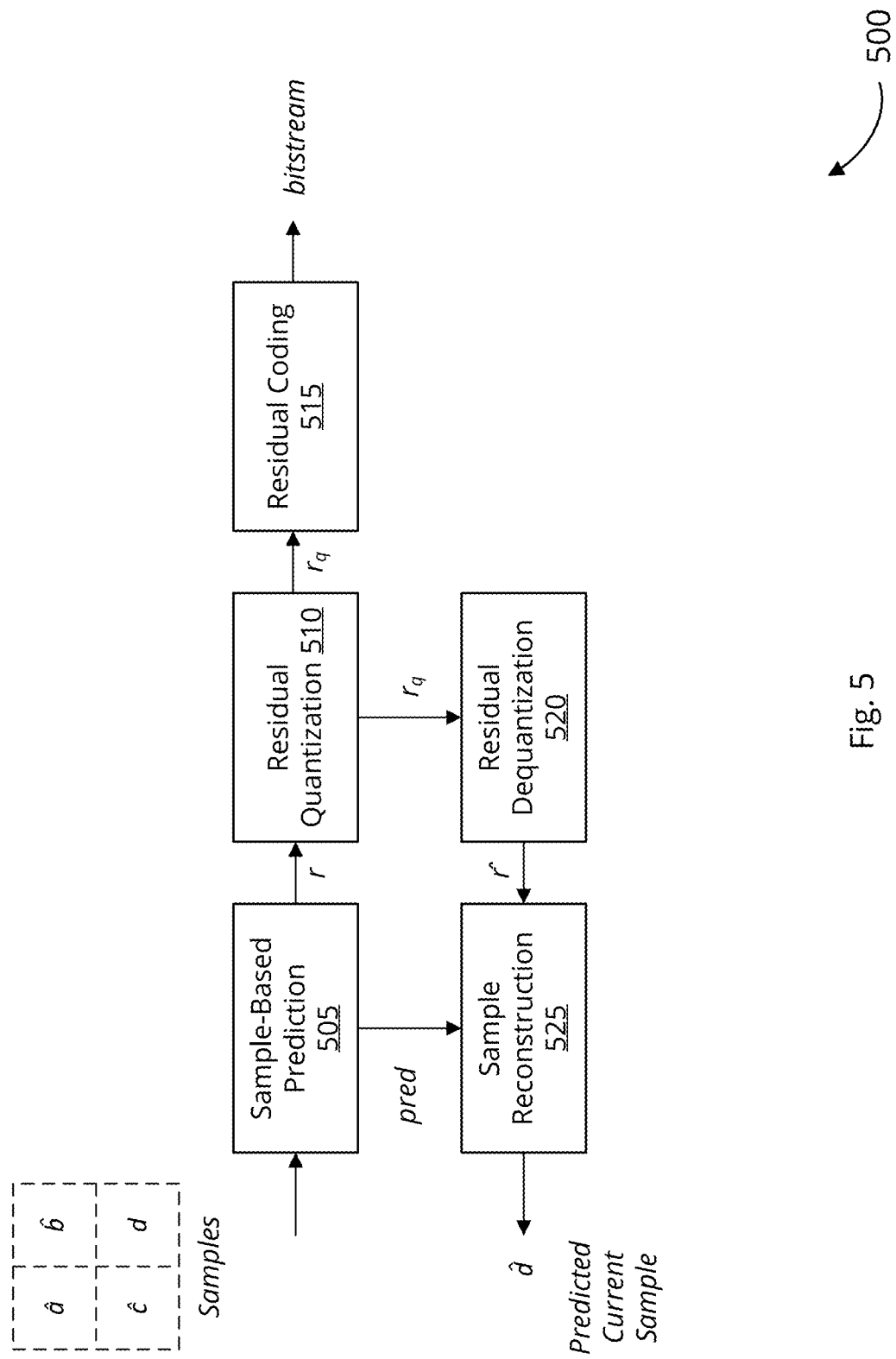
FIG. 5 is a schematic block diagram of a sample-based reference block compression logic, in accordance with various embodiments.

FIG. 5 is a schematic block diagram of a sample-based reference block compression logic 500, in accordance with various embodiments. The reference block compression logic 500 includes sample-based prediction logic 505, residual quantization logic 510, residual coding logic 515, residual dequantization logic 520, and sample reconstruction logic 525. It should be noted that the various elements of the sample-based reference block compression logic 500 are schematically illustrated in FIG. 5, and that modifications to the various components and other arrangements of the sample-based reference block compression logic 500 may be possible and in accordance with the various embodiments.

In various embodiments, the sample-based reference block compression logic 500 is an example of one implementation of a lossy compression algorithm. The sample-based prediction logic 505 may be configured to predict a current sample from its reconstructed neighboring samples. A current sample, as used herein, may refer to different parts of a respective block being compressed, based on neighboring samples (e.g., neighboring parts of the reference block). The sample may, accordingly, be predicted via the sample-based prediction logic 505, and the prediction residual, r, may be quantized via the residual quantization logic 510. The quantized residual, $r_q$, may then be sent to residual coding logic 515 to be encoded into a bitstream 515. The $r_q$ may further be compressed, for example, using a k-th Exp-golomb code. The compressed residual may be dequantized using residual dequantization logic 520, and added to form a neighboring reconstructed sample, via sample reconstruction logic 525, for prediction of the next sample.

In some embodiments, a top-left sample, $\hat{a}$, may not be compressed, and copied to an output bitstream buffer. Thus, in some examples, the top-left sample $\hat{a}$ may always be coded without compression. The current sample may be denoted "d," a top right sample denoted $\hat{b}$, and bottom left sample denoted as $\hat{c}$. Indications of relative direction, such as "top," "left," "top left," etc., are used to describe the location of a respective sample within a given reference block, and relative to the current sample being processed. In various examples, the samples in a reference block may be processed in a raster scan order (e.g., a Z-scan order). Thus, compression of the sample may be performed as follows.

A copy of the top-left sample may be output to the output bitstream buffer, and $\hat{b}$ and $\hat{c}$ may be set to the value of the top-left sample. Moving in raster scan order, prediction of the current sample d may be performed via the sample-based prediction logic 505. If the current sample is located in the first row of the reference block, set the prediction for the current sample to the value of the left neighboring reconstructed sample. For example, the prediction for the current sample, pred, may be set as: pred=$\hat{c}$. Otherwise, if the current sample is located in the first column of the reference block, the prediction of the current sample may be set to the value of the top neighboring: pred=$\hat{b}$.

Otherwise, let $D_{min}$ be the minimum value of $$\text{of } |\hat{a}-\hat{b}|, |\hat{a}-\hat{c}| \text{ and } \left|\hat{a} - \frac{\hat{b}+\hat{c}+1}{2}\right|$$

and the prediction for the current sample may be given by:

$$pred = \begin{cases} \hat{b}, & \text{if } D_{min} = |\hat{a}-\hat{c}| \\ \hat{c}, & \text{else if } D_{min} = |\hat{a}-\hat{b}| \\ \frac{\hat{b}+\hat{c}+1}{2}, & \text{otherwise} \end{cases} \quad (\text{eq. 2})$$

where here (and hereafter)

$$|x| = \begin{cases} x, & \text{if } x \geq 0 \\ -x, & \text{otherwise} \end{cases}$$

Thus, the prediction residual for the current sample may be given as: r=d−pred.

The prediction for the current sample may be provided by sample-based prediction logic 505 to the sample reconstruction logic 525 for further processing, and the prediction residual may be provided to residual quantization logic 510.

Residual quantization logic 510 may be configured to perform residual quantization of the prediction residual as follows.

$$r_q = \begin{cases} \dfrac{16*r + \dfrac{16+qp}{2}}{16+qp}, & \text{if } r \geq 0 \\ -\dfrac{-16*r + \dfrac{16+qp}{2}}{16+qp}, & \text{otherwise} \end{cases} \quad (eq.\ 3)$$

In various examples, residual coding logic 515 use a k-th Exp-golomb code to compress the quantized prediction residual $r_q$, where the signed residual $r_q$ is converted into unsigned data by $e=r_q-1$ before applying the compression with the k-th Exp-golomb code. Some examples of Exp-golomb code are provided below in Table 1.

TABLE 1

Exp-golomb-k coding examples

| e | k = 0 | k = 1 | k = 2 | k = 3 | e | k = 0 | k = 1 | k = 2 | e | k = 0 | k = 1 | k = 2 | k = 3 |
|---|-------|-------|-------|-------|---|-------|-------|-------|---|-------|-------|-------|-------|
| 0 | 1 | 10 | 100 | 1000 | 10 | 0001011 | 001100 | 01110 | 20 | 000010101 | 00010110 | 0011000 | 011100 |
| 1 | 010 | 11 | 101 | 1001 | 11 | 0001100 | 001101 | 01111 | 21 | 000010110 | 00010111 | 0011001 | 011101 |
| 2 | 011 | 0100 | 110 | 1010 | 12 | 0001101 | 001110 | 0010000 | 22 | 000010111 | 00011000 | 0011010 | 011110 |
| 3 | 00100 | 0101 | 111 | 1011 | 13 | 0001110 | 001111 | 0010001 | 23 | 000011000 | 00011001 | 0011011 | 011111 |
| 4 | 00101 | 0110 | 01000 | 1100 | 14 | 0001111 | 00010000 | 0010010 | 24 | 000011001 | 00011010 | 0011100 | 00100000 |
| 5 | 00110 | 0111 | 01001 | 1101 | 15 | 000010000 | 00010001 | 0010011 | 25 | 000011010 | 00011011 | 0011101 | 00100001 |
| 6 | 00111 | 001000 | 01010 | 1110 | 16 | 000010001 | 00010010 | 0010100 | 26 | 000011011 | 00011100 | 0011110 | 00100010 |
| 7 | 0001000 | 001001 | 01011 | 1111 | 17 | 000010010 | 00010011 | 0010101 | 27 | 000011100 | 00011101 | 0011111 | 00100011 |
| 8 | 0001001 | 001010 | 01100 | 010000 | 18 | 000010011 | 00010100 | 0010110 | 28 | 000011101 | 00011110 | 000100000 | 00100100 |
| 9 | 0001010 | 001011 | 01101 | 010001 | 19 | 000010100 | 00010101 | 0010111 | 29 | 000011110 | 00011111 | 000100001 | 00100101 |

In various examples, the signaling of Exp-golomb code order, i.e. k, can be implicit if a fixed order is used across the board, or k is signaled at high-level (e.g. sequence level, picture level, slice level and etc.) if a content adaptive k is desired. In some of implementations, k can be made block-row adaptive, with the order of Exp-golomb code for the current block row being determined by the data statistics of the previous block row.

Residual dequantization may be performed, via the residual dequantization logic 520, where the residual inverse quantization may be performed as:

$$\hat{r} = \begin{cases} \dfrac{r_q*(16+qp)+8}{16}, & \text{if } r_q \geq 0 \\ -\dfrac{-r_q*(16+qp)+8}{16}, & \text{otherwise} \end{cases} \quad (eq.\ 4)$$

The dequantized residual, $\hat{r}$, may then be reconstructed, via sample reconstruction logic 525, to reconstruct the current sample as: $\hat{d}=\hat{r}+pred$. Processing of samples may proceed to the next sample in the reference block in raster scan order (or exited if the last sample has been reached).

Figure 6:
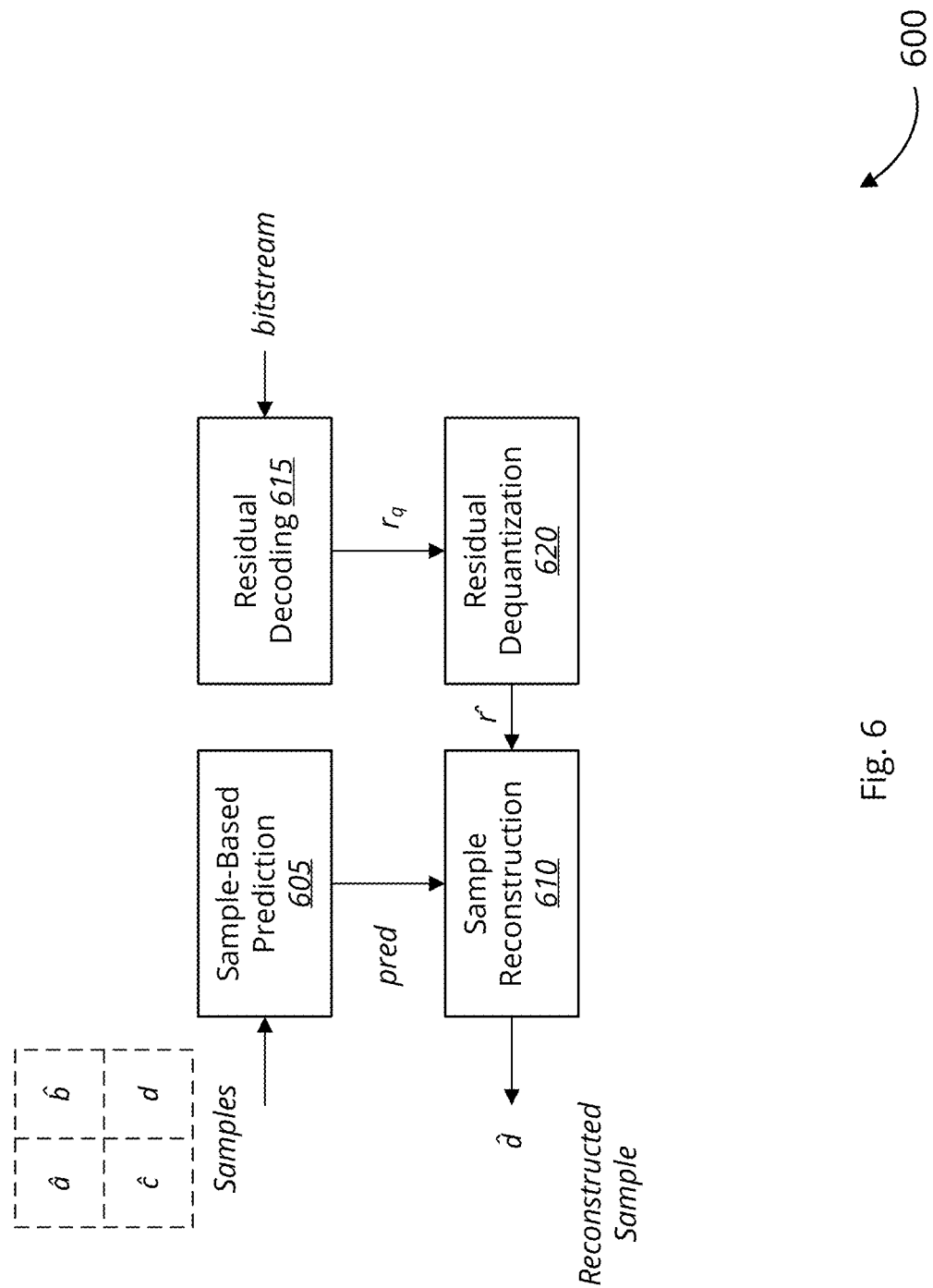
FIG. 6 is a schematic block diagram of a sample-based reference block decompression logic, in accordance with various embodiments.

FIG. 6 is a schematic block diagram of a sample-based reference block decompression logic 600, in accordance with various embodiments. The sample-based reference block decompression logic 600 includes sample-based prediction logic 605, residual decoding logic 615, sample reconstruction logic 610, and residual dequantization logic 620. It should be noted that the various elements of the sample-based reference block decompression logic 600 are schematically illustrated in FIG. 6, and that modifications to the various components and other arrangements of the sample-based reference block decompression logic 600 may be possible and in accordance with the various embodiments.

In various examples, sample-based prediction logic 605 may copy the top-left sample from the bitstream buffer, set $\hat{b}$ and $\hat{c}$ to the value of the top-left sample moving to the next sample (in raster scan order). A prediction, pred, for the current sample, d, may be generated as previously described with respect to FIG. 5 and set forth in eq. 2. The prediction may be provided to sample reconstruction logic 610.

Residual decoding logic 615 may receive a coded, compressed bitstream, which is then decoded to obtain the quantized prediction residual, $r_q$. As previously described, in various embodiments, the bitstream may have been coded using a kth Exp-golomb code. Letting e be the decoded data from the bitstream, the predication residual $r_q$ may be reconstructed as:

$$r_q = \begin{cases} \dfrac{e}{2}, & \text{if } e \text{ is an even number} \\ -\left(\dfrac{e+1}{2}\right), & \text{otherwise} \end{cases} \quad (eq.\ 5)$$

Residual dequantization may then be performed on the reconstructed prediction residual via the residual dequantization logic 620. Residual dequantization may be performed as previously described with respect to FIG. 5, and set forth in eq. 4.

The reconstructed sample of the current sample may then be determined, via the sample reconstruction logic 610, as previously described: $\hat{d}=\hat{r}+pred$.

Figure 7:
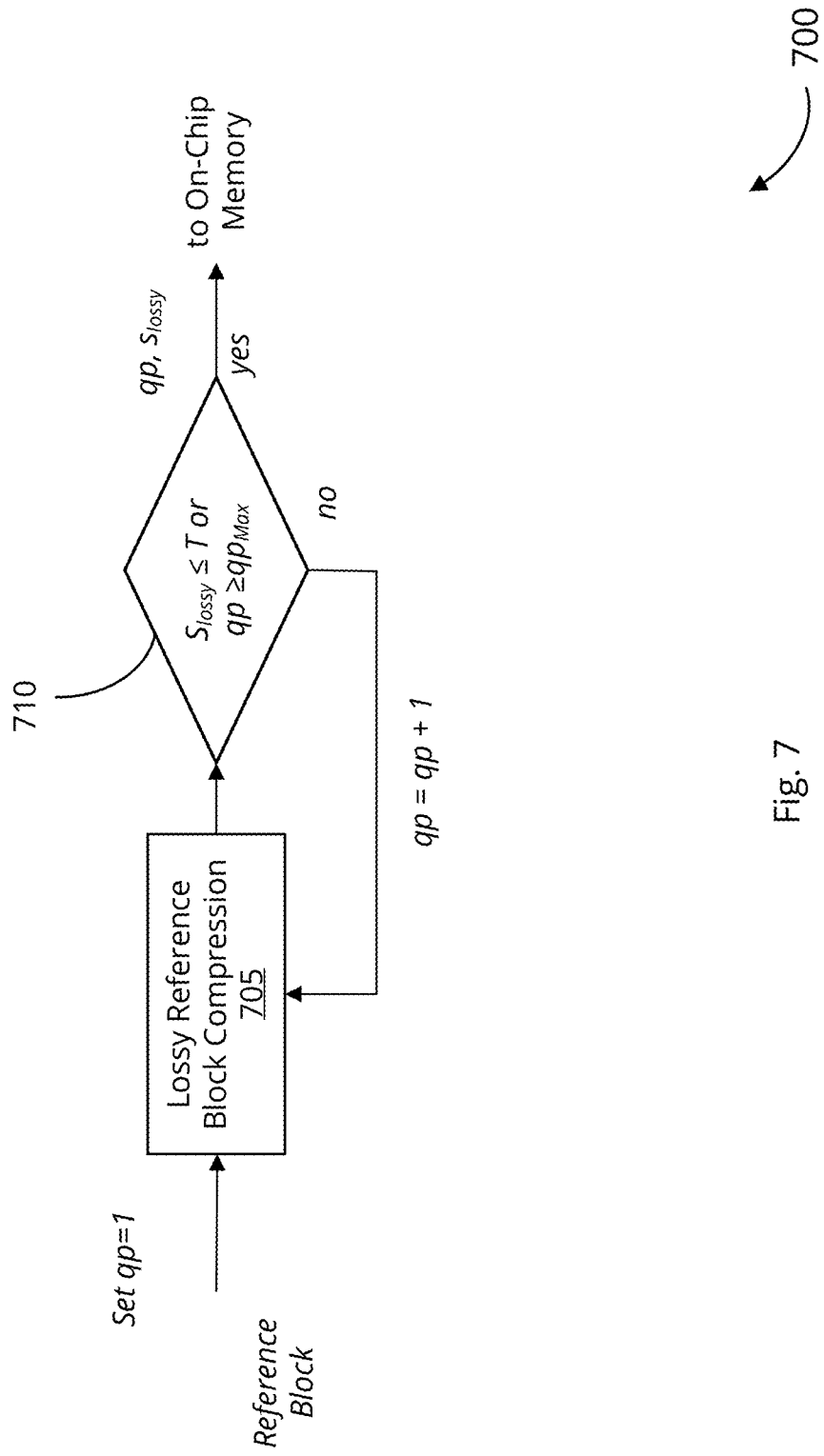
FIG. 7 is a schematic diagram of a lossy reference block compression algorithm, in accordance with various embodiments.

FIG. 7 is a schematic diagram of a lossy reference block compression algorithm 700, in accordance with various embodiments. Specifically, the lossy reference block compression algorithm 700 may include an algorithm for selection of a quantization parameter (qp) based on a check for conditions at decision block 710.

In various embodiments, the lossy reference block compression logic 705 may perform an initial lossy compression on a reference block with an initial qp=1. Decision block 710 may then perform a check for the condition: $S_{lossy} \leq T$ or $qp \geq qp_{max}$, where T is a predefined threshold and previously described (e.g., half of the original block size). In various examples, the decision block 710 may be implemented, for example, as part of the lossy compression logic 210 previously described. If either condition is met, qp and $S_{lossy}$ may be output to an on-chip memory buffer. If neither condition is met, qp may be incremented, in this example, by setting: qp=qp+1. Lossy reference block compression 705 may perform a lossy compression on the reference block again with the new qp, and repeated until the conditions of the decision block 710 are met.

A Bjontegaard delta rate (BD rate) increase caused by the lossy memory bandwidth compression may be reduced by optimizing the quantization parameter selection in the reference block compression algorithm. Accordingly, the lossy reference block compression algorithm 700, and specifically the conditions of decision block 710, provide one example of a brute-force method for selection of a qp, for purposes of explanation only. It is to be understood that in other embodiments, other suitable algorithms may be implemented for qp selection, and that other embodiments are not limited to the brute force method set forth above.

In this method, qp selected for each block will need to be stored in on-chip memory buffer. In some examples, the 2-bit compression algorithm indicator may instead be modified to a 1-bit flag to indicate whether the block is compressed or not, and n-bits may be used to signal the value of qp if the block is compressed, with n being determined by a pre-defined $qp_{max}$. In some examples, the maximum quantization parameter $qp_{max}$ may be implicit (i.e. without signaling) if a single $qp_{max}$ (e.g. 31) is used across the board, or signaled at high level in the bitstream (e.g. sequence level, picture level or slice level). In some further example, to reduce the storage size of the selected qp for each block, a qp to qp index table may be defined. For example, if $qp_{max}$ is set to 31, a 5-bit value would be needed to represent the selected qp for a block. However, if a mapping table, e.g. qp [8]={0, 1, 2, 4, 8, 16, 24, 31}, is defined, then only 3-bit value per block would be needed for qp storage, because the qp index in the range of [0:7] may be stored instead of the qp having a value of [0:31].

The embodiments set forth above with respect to FIGS. 1-7 may be implemented customized hardware (such as programmable logic controllers, single board computers, FPGAs, custom ICs, and SoCs) might be used, and/or particular elements might be implemented in hardware, software, or both. As such, some embodiments may employ a computer or hardware system (such as a signal processor or other video processing system) to perform processes and functionality in accordance with various embodiments. According to a set of embodiments, some or all of the procedures and/or methods may be performed in response to a processor executing one or more sequences of one or more instructions.

A set of these instructions and/or code might be encoded and/or stored on a non-transitory computer readable storage medium, such as on-chip memory. In other embodiments, the storage medium might be separate from a computer system (i.e., a removable medium, such as a compact disc, etc.), and/or provided in an installation package, such that the storage medium can be used to program, configure, and/or adapt a computer or processor with the instructions/code stored thereon. These instructions might take the form of executable code, which is executable by a computer system and/or processor of the computer system, which, upon compilation and/or installation on the computer system (e.g., using any of a variety of generally available compilers, installation programs, compression/decompression utilities, etc.) then takes the form of executable code.

The terms "machine readable medium" and "computer readable medium," as used herein, refer to any medium that participates in providing data that causes a machine to operate in a specific fashion. In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, read-only memory, solid state memory, optical and/or magnetic disks, among other non-volatile storage devices. Volatile media includes, without limitation, dynamic memory, such as DRAM.

Common forms of physical and/or tangible computer-readable media include, for example, a floppy disk, a flexible disk, a hard disk, magnetic tape, or any other magnetic medium, a CD-ROM, any other optical medium, punch cards, paper tape, any other physical medium, a RAM, a PROM, an EPROM, a FLASH-EPROM, any other memory chip or cartridge, a carrier wave as described hereinafter, or any other medium from which a computer can read instructions and/or code.

Figure 8:
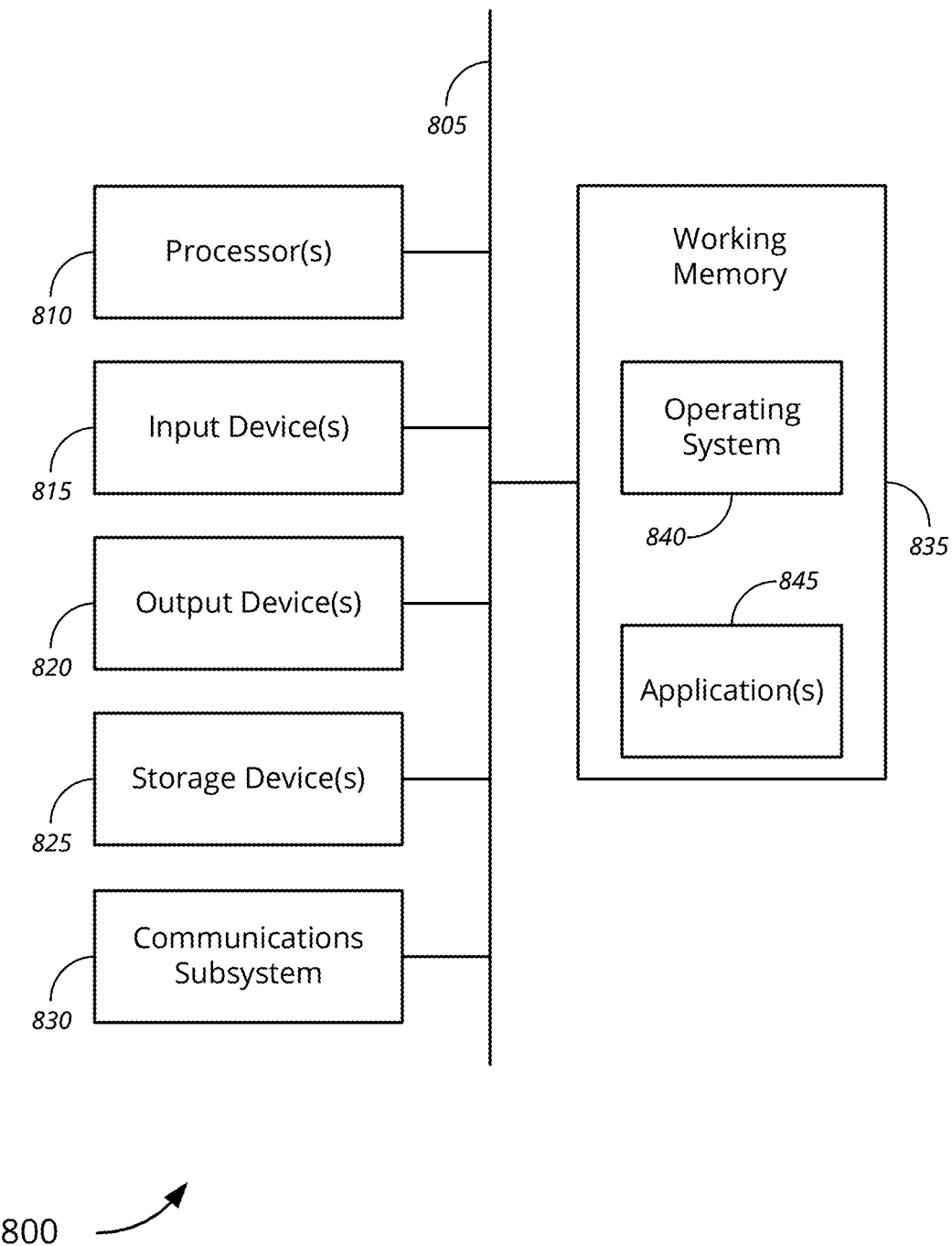
FIG. 8 is a schematic block diagram of a computer system for in-loop memory bandwidth compression in video coding, in accordance with various embodiments.

FIG. 8 provides a schematic illustration of one embodiment of a computer system 800, such as the media decoder 100, or subsystems thereof, such as decoding logic, prediction logic, memory bandwidth compression logic, memory bandwidth decompression logic, or combinations thereof, which may perform the methods provided by various other embodiments, as described herein. It should be noted that FIG. 8 only provides a generalized illustration of various components, of which one or more of each may be utilized as appropriate. FIG. 8, therefore, broadly illustrates how individual system elements may be implemented in a relatively separated or relatively more integrated manner.

The computer system 800 includes multiple hardware elements that may be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and microcontrollers); one or more input devices 815, which include, without limitation, a mouse, a keyboard, one or more sensors, and/or the like; and one or more output devices 820, which can include, without limitation, a display device, and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 800 might also include a communications subsystem 830, which may include, without limitation, a modem, a network card (wireless or wired), an IR communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or an LP wireless device as previously described. The communications subsystem 830 may permit data to be exchanged with a network (such as the network described below, to name one example), with other computer or hardware systems, between data centers or different cloud platforms, and/or with any other devices described herein. In many embodiments, the computer system 800 further comprises a working memory 835, which can include a RAM or ROM device, as described above.

The computer system 800 also may comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer-readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a non-transitory, physical, and/or tangible storage medium. In some embodiments, a computer-readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer-readable medium may take the form of transmission media, which includes, without limitation, coaxial cables, copper wire, and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including, without limitation, radio, acoustic, and/or light waves, such as those generated during radio-wave and infra-red data communications).

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally receives the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

While some features and aspects have been described with respect to the embodiments, one skilled in the art will recognize that numerous modifications are possible. For example, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
a processor; and
a non-transitory computer-readable medium in communication with the processor, the non-transitory computer-readable medium having encoded thereon a set of instructions executable by the processor to:
generate a reference block of video data, wherein the reference block is generated, at least in part, based on an encoded bitstream;
select one of a first compressed block generated from the reference block using a lossless compression algorithm, a second compressed block generated from a reference block using a lossy compression algorithm, or an uncompressed block that is a copy of the reference block based, at least in part, on at least one of a first block size of the first compressed block, a second block size of the second compressed block;
write a selected block of the first compressed block, second compressed block, or uncompressed block to an off-chip memory; and
write a compression algorithm indicator associated with the selected block of the first compressed block, second compressed block, or uncompressed block to an on-chip memory, wherein the compression algorithm indicator is configured to indicate whether the selected block is compressed or uncompressed.

2. The apparatus of claim 1, wherein selecting one of the first compressed block, second compressed block, and uncompressed block further comprises:
in response to determining that the first block size is less than or equal to a threshold size, selecting the first compressed block;
in response to determining that the first block size is greater than the threshold size and the second block size is less than or equal to the threshold size, selecting the second compressed block; and
in response to determining that the first block size and the second block size are greater than the threshold size, selecting the uncompressed block.

3. The apparatus of claim 2, wherein the threshold size is equal to half of the uncompressed block size.

4. The apparatus of claim 1, wherein the compression algorithm indicator is further configured to indicate whether the first or second compression algorithm is used.

5. The apparatus of claim 1, wherein the set of instructions further comprises instructions executable by the processor to:
fetch the selected block from the off-chip memory;
fetch the compression algorithm indicator associated with the selected block from the on-chip memory;
generate a reconstructed block from the selected block, wherein generating the reconstructed block includes selecting, based on the compression algorithm indicator, one of a first decompression algorithm or second decompression algorithm to be applied to the selected block, or to copy the selected block; and
write the reconstructed block to the on-chip memory.

6. The apparatus of claim 1, wherein the second compression algorithm includes setting a maximum quantization parameter.

7. The apparatus of claim 6, wherein applying the second compression algorithm includes:
applying the second compression algorithm using a first quantization parameter to quantize the reference block,
determining whether the second block size is less than or equal to a threshold size and determining whether the first quantization parameter is less than the maximum quantization parameter, and
in response to determining that the first quantization parameter is less than the maximum quantization parameter or the second block size is less than or equal to the threshold size, applying the second compression algorithm using a second quantization parameter greater than the first quantization parameter.

8. The apparatus of claim 1, wherein the selected block takes the same space in the on-chip memory as the uncompressed block size.

9. The apparatus of claim 1, wherein the uncompressed block size is a multiple of a double data rate burst.

10. A method comprising:
generating a reference block of video data, wherein the reference block is generated, at least in part, based on an encoded bitstream;
selecting one of a first compressed block generated from the reference block using a lossless compression algorithm, a second compressed block generated from a reference block using a lossy compression algorithm, or an uncompressed block that is a copy of the reference block based, at least in part, on at least one of a first block size of the first compressed block, a second block size of the second compressed block, or an uncompressed block size of the uncompressed block;
writing a selected block of the first compressed block, second compressed block, or uncompressed block to an off-chip memory; and
writing a compression algorithm indicator associated with the selected block of the first compressed block, second compressed block, or uncompressed block to an on-chip memory, wherein the compression algorithm indicator is configured to indicate whether the selected block is compressed or uncompressed.

11. The method of claim 10, wherein the compression algorithm indicator is further configured to indicate whether the first or second compression algorithm is used.

12. The method of claim 10, wherein selecting one of the first compressed block, second compressed block, and uncompressed block further comprises:
in response to determining that the first block size is less than or equal to a threshold size, selecting the first compressed block;
in response to determining that the first block size is greater than the threshold size and the second block size is less than or equal to the threshold size, selecting the second compressed block; and
in response to determining that the first block size and the second block size are greater than the threshold size, selecting the uncompressed block.

13. The method of claim 12, wherein the threshold size is equal to half of the uncompressed block size.

14. The method of claim 10, further comprising:
fetching the selected block from the off-chip memory;
fetching the compression algorithm indicator associated with the selected block from the on-chip memory;
generating a reconstructed block from the selected block, wherein generating the reconstructed block includes selecting, based on the compression algorithm indicator, one of a first decompression algorithm or second decompression algorithm to be applied to the selected block, or to copy the selected block; and
writing the reconstructed block to the on-chip memory.

15. The method of claim 10, wherein the second compression algorithm includes setting a maximum quantization parameter.

16. A media coding system comprising:
   an off-chip memory buffer;
   an on-chip memory buffer;
   a video decoder coupled to the off-chip memory buffer and the on-chip memory buffer, the video decoder configured to:
      generate a reference block of video data, wherein the reference block is generated, at least in part, based on an encoded bitstream;
      select one of a first compressed block generated from the reference block using a lossless compression algorithm, a second compressed block generated from a reference block using a lossy compression algorithm, or an uncompressed block that is a copy of the reference block based, at least in part, on at least one of a first block size of the first compressed block, a second block size of the second compressed block, or an uncompressed block size of the uncompressed block;
      write a selected block of the first compressed block, second compressed block, or uncompressed block to an off-chip memory; and
      write a compression algorithm indicator associated with the selected block of the first compressed block, second compressed block, or uncompressed block to an on-chip memory, wherein the compression algorithm indicator is configured to indicate whether the selected block is compressed or uncompressed.

17. The media coding system of claim 16, wherein the second compression algorithm includes setting a maximum quantization parameter.

18. The media coding system of claim 16, wherein selecting one of the first compressed block, second compressed block, and uncompressed block further comprises:
   in response to determining that the first block size is less than or equal to a threshold size, selecting the first compressed block;
   in response to determining that the first block size is greater than the threshold size and the second block size is less than or equal to the threshold size, selecting the second compressed block; and
   in response to determining that the first block size and the second block size are greater than the threshold size, selecting the uncompressed block.

19. The media coding system of claim 18, wherein the threshold size is equal to half of the uncompressed block size.

20. The media coding system of claim 16, wherein the video decoder is further configured to:
   fetch the selected block from the off-chip memory buffer,
   fetch the compression algorithm indicator associated with the selected block from the on-chip memory buffer,
   generate a reconstructed block from the selected block, wherein generating the reconstructed block includes selecting, based on the compression algorithm indicator, one of a first decompression algorithm or second decompression algorithm to be applied to the selected block, or to copy the selected block, and
   write the reconstructed block to the on-chip memory buffer.

* * * * *